United States Patent
Kenney et al.

(10) Patent No.: US 9,461,855 B2
(45) Date of Patent: Oct. 4, 2016

(54) METHODS AND ARRANGEMENTS FOR SELECTING CHANNEL UPDATES IN WIRELESS NETWORKS

(71) Applicant: Intel Corporation, Santa Clara, CA (US)

(72) Inventors: Thomas J. Kenney, Portland, OR (US); Eldad Perahia, Portland, OR (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/730,993

(22) Filed: Dec. 29, 2012

(65) Prior Publication Data

US 2014/0010324 A1    Jan. 9, 2014

Related U.S. Application Data

(60) Provisional application No. 61/668,296, filed on Jul. 5, 2012.

(51) Int. Cl.
*H04L 27/22* (2006.01)
*H04L 27/26* (2006.01)
(Continued)

(52) U.S. Cl.
CPC .............. *H04L 27/22* (2013.01); *H04L 5/006* (2013.01); *H04L 5/0048* (2013.01);
(Continued)

(58) Field of Classification Search
CPC ... H04L 27/2675; H04L 5/006; H04L 27/01; H04B 1/76
USPC ........ 375/267, 316, 350; 370/203, 208, 210, 370/342, 345
See application file for complete search history.

(56) References Cited

U.S. PATENT DOCUMENTS 7,668,266 B2 * 2/2010 Chen .................... H04L 27/262
370/203
2003/0128751 A1    7/2003 Vandenameele-Lepla
(Continued)

FOREIGN PATENT DOCUMENTS

EP    1 389 861 A1    2/2004
EP    2413551 A1    2/2012
(Continued)

OTHER PUBLICATIONS

International Search Report and Written Opinion received for PCT Patent Application No. PCT/US2013/048809, mailed on Oct. 22, 2013, 12 pages.
(Continued)

*Primary Examiner* — Daniel Washburn
*Assistant Examiner* — Eboni Hughes
(74) *Attorney, Agent, or Firm* — Schubert Law Group PLLC

(57) ABSTRACT

Pilot logic may determine based upon channel and phase information how to process pilot tones that shift locations every N symbols in an orthogonal frequency division multiplexing (OFDM) packet transmission. Pilot logic may determine a signal-to-noise ratio (SNR) for the channel to determine how to process the shifting pilot tones. Pilot logic may also determine channel and phase information updates such as channel state information and phase correction information from pilot tones. In situations of high SNR, logic may use channel estimates and phase rotations that are obtained from locations of the pilot tones for phase tracking and updating the equalizer. In situations of low SNR, logic may use the phase rotations for phase tracking and not update the equalizer during the OFDM transmission. Logic may also determine the presence or absence of a Doppler effect on the transmission and transmit a selection for N to an access point in response.

30 Claims, 5 Drawing Sheets

(51) Int. Cl.
　　　*H04L 5/00*　　　(2006.01)
　　　*H04L 25/02*　　(2006.01)
　　　*H04L 25/03*　　(2006.01)

(52) U.S. Cl.
　　　CPC ........ *H04L 5/0085* (2013.01); *H04L 25/0226* (2013.01); *H04L 27/2613* (2013.01); *H04L 27/2694* (2013.01); *H04L 27/2695* (2013.01); *H04L 5/0023* (2013.01); *H04L 25/0204* (2013.01); *H04L 2025/0377* (2013.01)

(56) References Cited

U.S. PATENT DOCUMENTS

| | | | |
|---|---|---|---|
| 2004/0161066 | A1* | 8/2004 | Hwang ............. H04L 25/03159 375/350 |
| 2004/0246998 | A1 | 12/2004 | Ma et al. |
| 2005/0152314 | A1 | 7/2005 | Sun et al. |
| 2006/0072677 | A1 | 4/2006 | Kwak et al. |
| 2006/0269016 | A1 | 11/2006 | Long et al. |
| 2007/0206689 | A1 | 9/2007 | Koo et al. |
| 2009/0060075 | A1 | 3/2009 | Mohebbi |
| 2010/0208834 | A1 | 8/2010 | Van Zelst et al. |
| 2011/0294451 | A1 | 12/2011 | Bolinth et al. |
| 2012/0106614 | A1 | 5/2012 | Kim et al. |
| 2012/0207253 | A1 | 8/2012 | Park et al. |
| 2013/0177095 | A1* | 7/2013 | Sun ...................... H04B 7/0413 375/267 |

FOREIGN PATENT DOCUMENTS

| | | |
|---|---|---|
| JP | 2007-134911 A | 5/2007 |
| JP | 2008-512962 A | 4/2008 |
| JP | 2008-536342 A | 9/2008 |
| JP | 2008-543186 A | 11/2008 |
| WO | 2006/029313 A1 | 3/2006 |
| WO | 2006/112032 A1 | 10/2006 |
| WO | 2011/022464 A2 | 2/2011 |
| WO | 2011/042847 A2 | 4/2011 |
| WO | 2014/042751 A1 | 3/2014 |

OTHER PUBLICATIONS

International Preliminary Report on Patentability and Written Opinion Received for PCT Patent Application No. PCT/US2013/048809, mailed on Jan. 15, 2015, 8 pages.

Office Action received for Korean Patent Application No. 10-2011-7031020, mailed on Sep. 15, 2015, 6 pages of English Translation and 5 pages of Korean Office Action.

Mizoguchi, et al., "A Performance of a Symbol Timing Detection Circuit for OFDM Wireless LAN Systems", NTT Access Network Service System Laboratories, Aug. 1999, 1 page.

Office Action received for Japanese Patent Application No. 2015-516289, mailed on Jan. 5, 2016, 3 pages of English Translation and 4 pages of Japanese Office Action.

Extended European Search Report received for European Patent Application No. 13836403.9, mailed May 27, 2016, 11 pages.

Enis Kogan et al: "A Novel Frequency Synchronization Method for OFDM System with Frequency Domain Selection Combining Diversity", Wireless Communication Systems, 2006. ISWCS '06. 3rd International Symposium On, IEEE, PI, Sep. 1, 2006, pp. 796-799; ISBN: 978-1-4244-0397-4.

* cited by examiner

| SYMBOL NUMBER | 1 | 2 | 3 | 4 | 5 | 6 | 7 | 8 | 9 | 10 | 11 | 12 | 13 |
|---|---|---|---|---|---|---|---|---|---|---|---|---|---|
| PILOT TONES | -8 | -9 | -10 | -11 | -12 | -13 | -1 | -2 | -3 | -4 | -5 | -6 | -7 |
| | 6 | 5 | 4 | 3 | 2 | 1 | 13 | 12 | 11 | 10 | 9 | 8 | 7 |

METHODS AND ARRANGEMENTS FOR SELECTING CHANNEL UPDATES IN WIRELESS NETWORKS

BACKGROUND

Embodiments are in the field of wireless communications. More particularly, the present disclosure relates to selecting channel updates based upon at least signal quality.

DETAILED DESCRIPTION OF EMBODIMENTS

Figure 1:
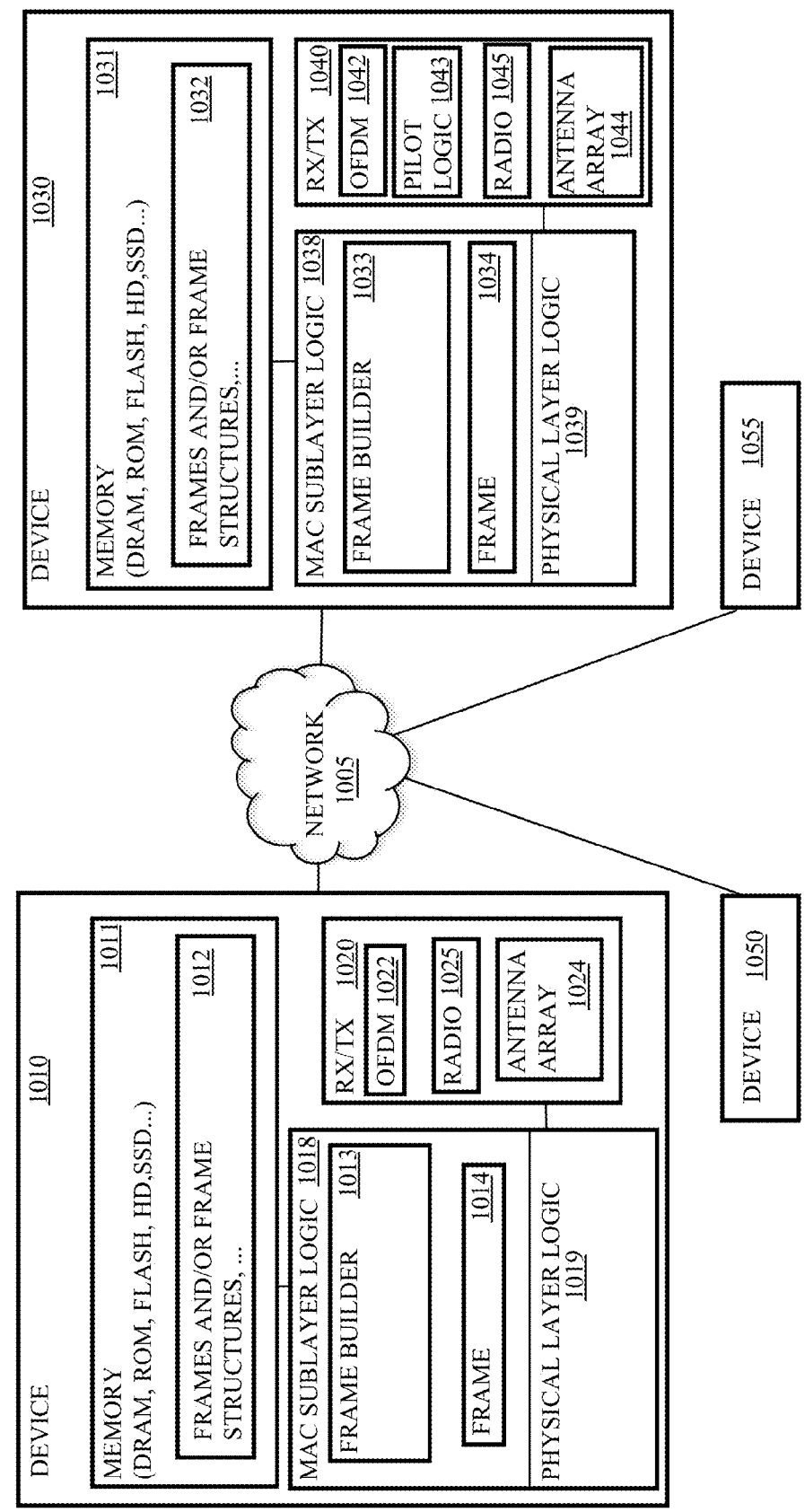
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

The Institute of Electrical and Electronic Engineers (IEEE) 802.11ah systems have bandwidths currently defined are 1 MHz (MegaHertz) and a set of down-clocked IEEE 802.11ac rates, namely 2, 4, 8 and 16 MHz, where the down clocking is 10×. The 1 MHz system may use a 32-point fast Fourier transform (FFT). Of those 32 carriers, 24 will be used for data and 2 for pilot. Additionally, a repetition mode is being included to extend range.

One of the issues for IEEE 802.11ah wireless networks is that with the lower data rates of the IEEE 802.11ah system, and the added use case of outdoor sensor and offloading, the Channel Doppler effect becomes significant for longer packets. For example, using the 1 MHz mode, a packet with moderate to large payload sizes can exceed tens of milliseconds. The packet times were much lower for the IEEE 802.11n/ac system, which was largely designed for indoor use, and thus the channel was assumed stationary over the entire packet. It has been shown that for modest Doppler, the IEEE 802.11ah system performance may be severely degraded without additional training, or channel updates, during the transmission of long packets.

Embodiments may make use of known pilot symbol tones shifting across the bandwidth of the orthogonal frequency division multiplexing (OFDM) packet during transmission of the packet to allow receivers to track the channel and phase information during the transmission of the packet. Thus, the pilot information can be used to compute channel updates to the channel state information for those tones and the phase correction information to track channel phase with different tones.

Embodiments may comprise pilot logic to determine based upon channel and phase information how to process pilot tones that shift locations every N symbols in an orthogonal frequency division multiplexing (OFDM) packet transmission. In many embodiments, the pilot logic may determine a signal-to-noise ratio (SNR) for the channel to determine how to process the shifting pilot tones. In several embodiments, the pilot logic may determine channel and phase information updates such as channel state information and phase correction information from the pilot tones. In several embodiments, in situations of high SNR, the logic may use channel estimates and phase rotations that are obtained from locations of the pilot tones for phase tracking and updating the equalizer. In further embodiments, in situations of low SNR, the logic may use the phase rotations for phase tracking and not update the equalizer during the OFDM transmission. In some embodiments, the logic may determine the presence or absence of a Doppler effect on the transmission and transmit a selection for N to an access point or otherwise signal the access point in response to the determination.

Some embodiments may include the feature of allowing the receiver to select the value of N in terms of the number of symbols during which the pilot tones remain at the same locations. Selecting the value for N based on instantaneous channel and phase information should take into consideration that the IEEE 802.11ah system has a use case that includes of low power sensors. First, these devices exchange information infrequently and additionally are typically very low power devices, so the design constraint is to minimize their time "awake". So embodiments may add bits to the signal field in the preamble of communications, request that the MAC sublayer request the selection of the N value or signal the access point in another way. Such are affirmative ways to inform the access point. Some embodiments may alternatively inform the access point via receiver quality measurement exchanges. For instance, in one such embodiment, an access point may process the receiver quality measurements to make the same determination about the value of N as the decision made by the receiver. In some embodiments, this determination may be assumed by the receiver or may be assumed by the receiver if the access point advertised as a certain capability.

In many embodiments, transmitters shift the location of the pilot tones every N symbols, where N may be a system parameter, setting, or a fixed value. Thus, the location of the pilot tones remain constant for N symbols before shifting to the next location. In several embodiments, a receiver may then use the N pilot symbols to make a channel estimate or determine a phase rotation using appropriate algorithms. Some embodiments described herein may implement the pilot shifting with N fixed to a value of one, which means the pilot tones shift every symbol and the implementation of a fixed value for N may also remove a need of signaling between transmitter and receiver to update the value of N because the single value used at the transmitter may be predetermined. Note that references to the locations of the pilot tones refer to the sub-carriers or frequencies of the pilot tones.

Various embodiments may be designed to address different technical problems associated with channel updates with shifting pilot tones. For instance, some embodiments may be designed to address one or more technical problems such as determining how to use the pilot or channel and phase information determined by processing the shifting pilot tones.

Different technical problems such as those discussed above may be addressed by one or more different embodiments. For instance, some embodiments that address how to use the pilot or channel and phase information determined by processing the shifting pilot tones may do so by one or more different technical means such as processing the OFDM transmission to determine the SNR, processing the OFDM transmission to determine the existence or absence of Doppler components, detecting signal energy to determine whether the receiver appears to be moving, communicating with the MAC sublayer to determine whether the receiver is moving, comparing the SNR to a threshold to determine whether the SNR is high or low, processing the phase correction information without updating the equalizer, determining channel and phase information updates such as channel state information and phase correction information from pilot tones, processing the channel and phase information for phase tracking and updating the equalizer, and the like.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee-.org/getieee802/download/802.11-2012.pdf).

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

When the communications device 1010 transmits a packet to the communications device 1030 to notify the communications device 1030 that, e.g., the communications device 1010 is buffering data for the communications device 1030, the communications device 1010 may transmit an orthogonal frequency division multiplexing (OFDM) packet encapsulating a frame 1014. The OFDM 1022 of the transceiver (RX/TX) 1020 may generate the transmission with pilot tones shifting locations within the symbol indices of the transmission every N symbols. In some embodiments, the communications device 1010 may have previously transmitted an indication of the value of N to the communications device 1030. In such embodiments, the indication may be transmitted within frame 1014, e.g., a field in the header may numerate N. In further embodiments, the value of N may be a fixed value. And, in some embodiments, the value of N is fixed at a value of one or fixed to a value of two.

The communications device 1010 may transmit the OFDM packet one symbol after the other sequentially and, every N symbols, the location of the pilot tones within the OFDM packet may change either sequentially or randomly. In some embodiments, for instance, the location of the pilot tones may shift sequentially by one symbol index to the next symbol index, or, in other words, from one sub-carrier to the adjacent sub-carrier. In other embodiments, the location or frequency of the sub-carrier of the pilot tones may shift randomly rather than sequentially based upon a time domain function.

Pilot tone shifting is a process where the pilot tones are sequentially assigned to different subcarriers as a function of time. In many embodiments, only a subset of subcarriers may be used for pilot tones or data purposes (usable sub-carriers). For example, the pilot tones may be used only on data sub-carriers (e.g., sweep through with the pilot tone on a symbol by symbol basis), may avoid nulled sub-carriers (e.g., DC subcarriers and guard subcarriers), an, in some embodiments, may even avoid data tones that are adjacent to guard or DC subcarriers, and further in some embodiments may avoid a subset of data tones, for example all even numbered tones.

Figures 1A, 1B:
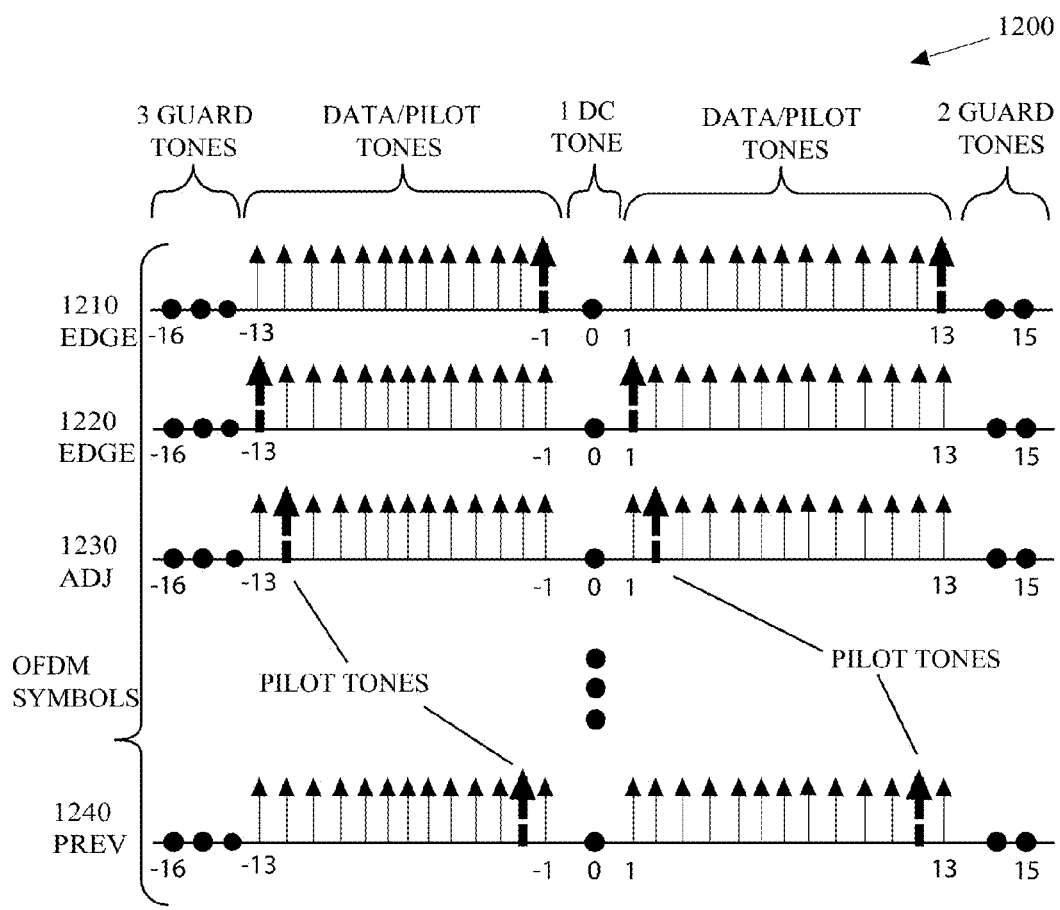
FIG. 1A depicts an embodiment of a table illustrating pilot tone locations.
FIG. 1B depicts embodiments of orthogonal frequency division multiplexing (OFDM) symbols in an OFDM packet transmission with shifting pilot tones.

The pilot tones and their positioning can be based on channel conditions such as coding scheme, packet length, and the like. FIG. 1A depicts a table 1100 of pilot tone positions demarked by symbol numbers. The following discussion is for the 1 MHz systems and is an example. There are other allocations for the 2, 4, 8 and 16 MHz bandwidths.

The table 1100 shows a progression of symbols from 1 to 13 transmitted from the communications device 1010 to the communications device 1030. The number of symbols is chosen in the present embodiment based upon the number of data and pilot tones, or useable sub-carriers, and the pattern of pilot locations in relation to the symbol indices are sequential and repeat after 13. In particular, the table 1100 illustrates two pilot tones for each symbol number. One pilot tone travels between the −13 subcarrier index and a −1 subcarrier index and the second pilot tone travels between the 1 subcarrier index and the 13 subcarrier index. For example, the first symbol transmitted may be symbol 1, which has two pilot tones, one located at the subcarrier index −8 and one located at the subcarrier index 6. The second symbol transmitted may then be symbol 2 with pilot tones at the subcarrier indices −9 and 5. The third symbol transmitted may then be symbol 3 with pilot tones at the subcarrier indices −10 and 4 and these pilot tone shifts continue through symbol 13 at which the pilot tones are at the subcarrier indices −7 and 7.

As shown in the table 1100, the pilot tones are shifted or assigned to different tones (sub-carriers) or frequency bins as a function of time, which is referred to herein as the locations of the pilot tone. The time between shifts in the location of the pilot tones is N=1 in table 1100 so the pilot tones shift between locations between every symbol. The table 1100 also illustrates the pilot tones changing by one subcarrier index at a time and sequentially. However, not all embodiments may implement a location for pilot tones as a function of time that results in the pilot tones shifting through sub-carriers or frequencies sequentially. In other words, the location of the pilot tones may shift every N symbols {N=1, 2, 3, 4 . . . , 8, . . . } but the shift in frequency/location may be random within the subset of sub-carriers rather than sequential. The shifting of the pilot tones can also be based on the modulation and coding scheme (MCS) used for transmission or on the packet length of the transmission (i.e., channel conditions). Further, the amount of time the one or more pilot tones occupy a particular location could be based on a modulation and coding scheme (MCS) and the MCS may be selected based on a data rate and a level of robustness required by traffic type. After a set of pilot tones are assigned, the process illustrated by the table 1100 is cyclic and may be repeated over any number of symbols greater than 13.

The communications device 1030 may receive the transmission from the communications device 1010 and may utilize channel and phase information determined by processing the pilot tones to repeatedly or, in some embodiments, to continually update the channel and phase information with the pilot information. The communications device 1030 may implement pilot logic 1043 to receive and process the pilot tones to determine channel and phase information (sometimes referred to as pilot information) and to use the channel and phase information to update processing of the data signals received for the OFDM packet. The pilot logic 1043 may also determine how to use the channel and phase information. In particular, the pilot logic 1043 may perform initial measurements of the channel based upon training sequences in the preamble of the OFDM transmission. The training sequences may facilitate the calculation of weight values or coefficients to update an equalizer of the pilot logic 1043.

In several embodiments, the pilot logic 1043 may use signal-to-noise ratio (SNR) information to determine whether the channel over which the communications device 1030 is communicating with the communications device 1010 has a high SNR or a low SNR. In response to determining that the channel has a high SNR, the pilot logic 1043 may determine that both the phase tracker and the equalizer should be updated to compensate for changes in the phase and channel during the transmission of the OFDM packet from the communications device 1010 to the communications device 1030. In such embodiments, the pilot logic 1043 may utilize a channel estimator to determine channel estimations or channel state information to update the weight coefficients in a weighted equalization function of the equalizer to equalize the pilot tones.

In further embodiments, the pilot logic 1043 may use signal-to-noise ratio (SNR) information to determine that the channel over which the communications device 1030 is communicating with the communications device 1010 has a low SNR. In response to determining that the channel has a low SNR, the pilot logic 1043 may determine that only the phase tracker should be updated to compensate for changes in the phase and channel during the transmission of the OFDM packet from the communications device 1010 to the communications device 1030. In other words, the pilot logic 1043 may determine to disable updating the channel estimation to the equalizer based upon determining low SNR or based upon the channel condition such as determining insignificant Doppler effects, in such a case the equalizer will continue using the channel estimates obtained originally from processing the training fields. In such embodiments, the pilot logic 1043 may utilize a phase tracker to process phase rotations of the pilot tones to track the phase of the received symbols.

In further embodiments, the pilot logic 1043 may have an option to communicate with the communications device 1010 to select the value of N for the shifting pilot tones, which is the number of symbols during which the pilot tones remain at the same location. In some embodiments, for instance, the pilot logic 1043 may have a way of signaling the access point and, in some embodiments, the pilot logic 1043 may rely on receiver quality measurement exchanges. In such embodiments, the pilot logic 1043 may determine whether the Doppler effect may be impairing the received signal. For instance, the pilot logic 1043 may determine if the channel and phase information provides an indication that the signal includes a Doppler component or the pilot logic 1043 may determine whether the communications device 1030 is moving. For instance, the pilot logic 1043 may determine that the communications device 1043 is moving based upon energy measurements that indicate changes in the energy level from signals such as the signal from the communications device 1010 or an indication from another part of the communications device 1030.

In response to determining that a Doppler effect may be impairing the received signal and determining that the SNR is high, some embodiments of the pilot logic 1043 may provide or signal an indication to the communications device 1010 that the communications device 1030 requests that N be set to 1 or, in other words, that the pilot tones shift every symbol. On the other hand, in response to determining that no Doppler effect is impairing the received signal and determining that the SNR is low, some embodiments of the pilot logic 1043 may provide or signal an indication to the communications device 1010 that the communications device 1030 requests that N be set to 2 or, in other words, that the pilot tones shift every other symbol. Note that, in some embodiments, the pilot logic 1043 may check to see if N is the appropriate number prior to signaling a request to the communications device 1010.

In some embodiments, the pilot logic 1043 may comprise logic to determine channel estimates and phase corrections to update weights associated with sub-carriers in the OFDM packet and phase corrections to correct the phases of sub-carriers in the channel used to transmit the OFDM packet. In many embodiments, the pilot logic 1043 will continuously update the channel state information and the phase correction information with each symbol received.

In the present embodiment, the pilot logic 1043 may receive the OFDM packet with pilot tones distributed across the bandwidth of the OFDM packet in accordance with the table 1100. The table 1100 provides an example of a pattern for 1 MHz system (32 tones FFT, 24 data and 2 pilot tones in each symbol) based on which pilots travel one symbol to another covering the entire bandwidth after 13 symbols. The pattern repeats periodically to cover all symbols in a packet.

FIG. 1B illustrates an embodiment of the OFDM packet 1200 transmitted from the communications device 1010 to the communications device 1030. The OFDM module 1022 may generate different OFDM symbols for different bandwidths such a 2 MHz, 4 MHz, 8 MHz, and 16 MHz and may generate the OFDM packet 1200 for a 1 MHz bandwidth channel, for transceivers such as the transceivers of FIG. 1, corresponding to a 32-point, inverse Fourier transform. The OFDM packet 1200 comprises 32 tones, also referred to as sub-carriers, indexed from −16 to 15. The 32 tones, in this embodiment, include 24 data tones, five guard tones, two pilot tones, and one direct current (DC) tone. The four lowest frequency tones are guard tones provided for filter ramp up and filter ramp down. The index zero frequency tone is the DC tone and is nulled, at least in part, to better enable the receivers to employ direct-conversion receivers to reduce complexity. As per a commonplace practice, the DC is selected to be one of the two subcarriers closest to the middle of the frequency band. And the data and pilot frequency tones are provided between indices −13 through −1 and indices 1 through 13.

The RF receiver comprises an OFDM module 1042, which receives electromagnetic energy at an RF frequency and extracts the digital data therefrom. For 1 MHZ operation, OFDM 1042 may extract OFDM symbols comprising 24 data tones, five guard tones, and one DC tone such as the OFDM symbol 1210 illustrated in FIG. 1B. In other embodiments, the OFDM symbols may be encoded in other manners with different numbers of data tones, pilot tones, and guard tones.

Note that the OFDM packet 1200 comprises OFDM symbols 1210, 1220, 1230, through 1240 and the OFDM symbols correspond to the pilot tone pattern illustrated in table 1100. In particular, the OFDM symbols 1210-1240 illustrate a dot for each of the guard tones, which are also referred to as edge tones. There is one dot in the center of the symbols 1210-1240 illustrating the position of the DC tone as symbol index 0, and the DATA/PILOT TONES are demarked with numbers that start at the subcarrier index −13 on the left side through the −1 index next to the DC tone at the 0 index, and continue with index 1 adjacent to the DC index 0 through the index 13 adjacent to the guard tones on the right side.

The OFDM symbol 1220 illustrates the OFDM symbol index 6 in table 1100 and the pilot tones are the emboldened arrows at subcarrier indices {−13, 1}. Note that the OFDM symbol 1210 has pilot tones {−1, 13} adjacent to the DC tone and the guard tones. The OFDM symbol 1220 has pilot tones {−13, 1} adjacent to the DC tone and the guard tones. The OFDM symbol 1230 has pilot tones {−12, 2} adjacent to the location of the symbol index that is adjacent to the DC tone and the guard tones. And, the OFDM symbol 1230 has pilot tones {−2, 12} adjacent to the location of the symbol index that is adjacent to the DC tone and the guard tones.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as structures for an association request frame, an association response frame, a probe frame, and the like.

The MAC sublayer logic 1018, 1038 may comprise logic to implement functionality of the MAC sublayer of the data link layer of the communications device 1010, 1030. The MAC sublayer logic 1018, 1038 may generate the frames and the physical layer logic 1019, 1039 may generate physical layer protocol data units (PPDUs) based upon the frames. For example, the frame builder may generate frames 1014, 1034. The physical layer logic 1019, 1039 may encapsulate the frames with preambles to generate PPDUs for transmission via a physical layer device such as the transceivers represented by receive/transmit chains (RX/TX) 1020 and 1040.

The communications devices 1010, 1030, 1050, and 1055 may each comprise a transceiver (RX/TX) such as transceivers (RX/TX) 1020 and 1040. In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data as OFDM symbols. The OFDM symbols are divided into several parallel data streams or channels, one for each sub-carrier and encoded with the sub-carriers by which the OFDM symbols will be transmitted to a receiving device such as twenty-four data sub-carriers, five guard sub-carriers, two pilot sub-carriers, and one DC subcarrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols in the front end of the transmitter during transmission to avoid inter-symbol interference (ISI), which might result from multi-path distortion.

Each transceiver 1020, 1040 comprises a radio 1025, 1045 comprising an RF transmitter and an RF receiver. The RF transmitter comprises an OFDM module 1022, which impresses digital data, OFDM symbols encoded with tones, onto RF frequencies, also referred to as sub-carriers, for transmission of the data by electromagnetic radiation. In the present embodiment, the OFDM module 1022 may impress the digital data as OFDM symbols encoded with tones onto the sub-carriers to for transmission. The OFDM module 1022 may transform information signals into signals to be applied via the radio 1025, 1045 to elements of an antenna array 1024.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044.

Figure 1C:
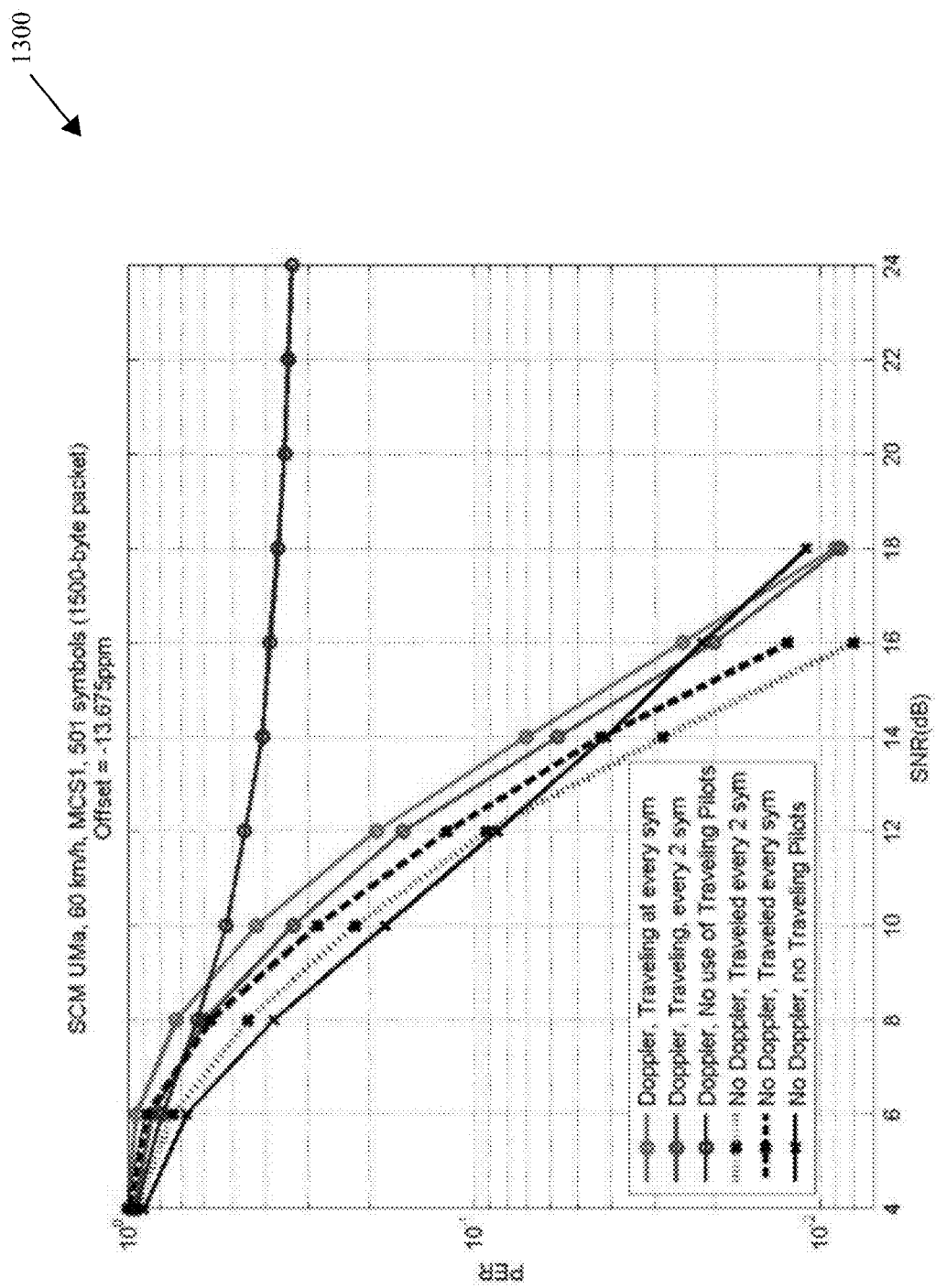
FIG. 1C depict embodiments of a simulation comparing the no shifting pilots versus shifting pilots with N=1 versus shifting pilots at N=2 for both receiver environments of Doppler effect present and no Doppler effect present.

FIG. 1C depicts embodiments of a simulation 1300 of the process implemented in the pilot logic 1043. In FIG. 1C, the graph shows packet error rate (PER) performance of a receiver that receives pilot tones shifting every symbol (N=1), pilot tones shifting every other symbol (N=2), and stationary pilot ones. These cases are run with Doppler applied and with No Doppler applied with both phase tracking and channel estimation with equalization updates operating.

The simulation study was conducted to determine the appropriate selection of the pilot dwell time N, and the appropriate receiver algorithms. This simulation case was for MCS1 1 MHz using a 1500 byte packet using all simulation impairments and a carrier offset of −13.675 ppm.

FIG. 1C shows that N=2 is better than N=1 at low SNR. It turns out that at Low SNR, the degradation for both N=1 and N=2 cases were due to the channel estimation being updated. Since the SNR was low, the new estimate was worse than the original Channel estimate obtained by the long training sequence. And, even with Doppler where the channel is changing, it is better at low SNR to not update the channel estimate. This is also evident by the fact that N=2 is better than N=1 at low SNR since there is a 3 decibels (dB) improvement in channel estimation SNR, but at higher SNR the N=1 is better since it was able to better track channel changes. Another discovery was that using the traveling pilots greatly improved performance in no Doppler channels, since they allow the tracking to be done across the band and thus have more immunity to frequency selective channel fades. For Doppler case, thus, even at Low SNR (e.g., below 6 dB or 8 dB) the traveling pilots are beneficial and provide significant gain, so the results imply that the shifting pilot tones should be used for phase tracking. For Doppler case, at mid to High SNR (e.g., above 6 or 8 dB), then both the channel estimation and phase tracking provide huge benefits so the results imply that both be used. For no Doppler case, the tipping SNR value is around 12 dB where solid black curve meets other black curves. Note that the actual thresholds implemented are specific to the receiver circuitry and logic so the values of what is considered "low SNR" and what is considered "high SNR" may vary depending upon the receiver configuration.

Therefore, the pilot logic 1043 may be implemented to determine the appropriate receiver techniques based environment and upon SNR. For low SNR and no detection of Doppler, only Phase tracking is updated using the shifting pilot tones (the channel estimate for those pilot tones and therefore the equalizer are not updated and continue using channel estimates obtained from training fields (LTFs)). For High SNR, both the channel estimate/equalizer and the phase tracking are updated based on the shifting pilot tones (also referred to as traveling pilots).

Figure 2:
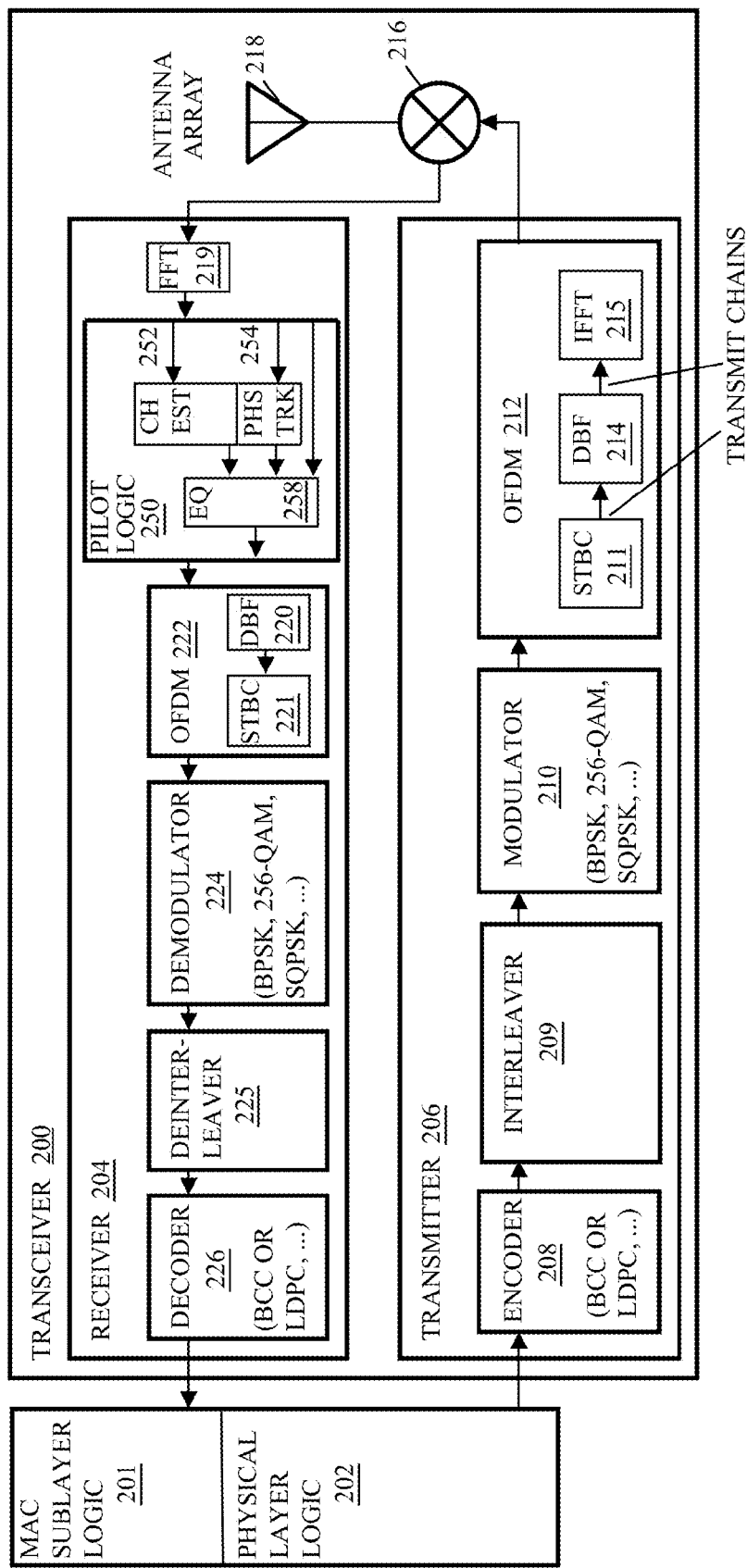
FIG. 2 depicts an embodiment of an apparatus with pilot logic to process shifting pilot tones.

FIG. 2 depicts an embodiment of an apparatus to generate, transmit, receive, and interpret or decode frames. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200. For example, a frame builder may generate a frame including a type field that specifies whether the frame is a management, control or data frame and a subtype field to specify the function of the frame. A control frame may include a Ready-To-Send or Clear-To-Send frame. A management frame may comprise a Beacon, Probe Response, Association Response, and Reassociation Response frame type. And the data type frame is designed to transmit data.

In many embodiments, the MAC sublayer logic 201 may comprise a frame builder 202 to generate frames. The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device. The preamble may comprise training sequences such as a short training field (STF) and a long training field (LTF) to provide initial channel updates to the receiving device to allow the receiving device to update weight coefficients for a weighting function implemented by an equalizer in the receiving device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid.

The output of modulator 209 is fed to an orthogonal frequency division multiplexing (OFDM) module 212. The OFDM module 212 may comprise a space-time block coding (STBC) module 211, a digital beamforming (DBF) module 214, and an inverse, fast Fourier transform (IFFT) module 215. The STBC module 211 may receive constellation points from the modulator 209 corresponding to one or more spatial streams and may spread the spatial streams to a greater number of space-time streams (also generally referred to as data streams). In some embodiments, the STBC 211 may be controlled to pass through the spatial streams for situations in which, e.g., the number of spatial streams is the maximum number of space-time streams. Further embodiments may omit the STBC.

The OFDM module 212 impresses or maps the modulated data formed as OFDM symbols onto a plurality of orthogonal sub-carriers so the OFDM symbols are encoded with the sub-carriers or tones. The OFDM module 212 may generate symbols in which the pilot tones change location within the data/pilot sub-carriers every N symbols. In many embodiments, the OFDM module 212 may generate symbols in which the pilot tones shift locations along the symbol indices sequentially. In several embodiments, the pilot tones may shift locations every symbol. For instance, when the communications device 1030 in FIG. 1 responds to a transmission from the communications device 1010, the RX/TX 1040 may respond with OFDM packets in which the pilot tones shift every N symbols. In some embodiments, the value of N may match the value of N provided by the communications device 1010. In other embodiments, the value of N may be a fixed value for the communications device 1030 and/or for the communications device 1010. And, in some embodiments, the communications device 1010, which may be the access point, may use a value of N provided to the communications device 1010 by the communications device 1030.

In some embodiments, the OFDM symbols are fed to the Digital Beam Forming (DBF) module 214. Digital beam forming techniques may be employed to increase the efficiency and capacity of a wireless system. Generally, digital beam forming uses digital signal processing algorithms that operate on the signals received by, and transmitted from, an array of antenna elements. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

The OFDM module 212 may also comprise an inverse Fourier transform module that performs an inverse discrete Fourier transform (IDFT) on the OFDM symbols. In the present embodiment, the IDFT may comprise the IFFT module 215, to perform an IFFT on the data. For 1 MHz bandwidth operation, the IFFT module 215 performs a 32-point, inverse FFT on the data streams.

The output of the OFDM module 212 may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. In other embodiments, the transceiver 200 may comprise one or more antennas rather than antenna arrays and, in several embodiments, the receiver 204 and the transmitter 206 may comprise their own antennas or antenna arrays.

The transceiver 200 may comprise a receiver 204 for receiving, demodulating, and decoding information bearing communication signals. The communication signals may comprise, e.g., 32 tones on a 1 MHz carrier frequency with pilot tones that shift every N symbols. For example, a data collection station compliant with IEEE 802.11ah for a farm may periodically receive data from low power sensors that have integrated wireless communications devices compliant with IEEE 802.11ah. The sensors may enter a low power mode for a period of time, wake to collect data periodically, and communicate with the data collection station periodically to transmit the data collected by the sensor. In some embodiments, the sensor may proactively initiate communications with the data collection station, transmit data indicative of a communications capability, and begin communicating the data to the data collection station in response to a clear-to-send (CTS) or the like. In other embodiments, the sensor may transmit data to the data collection station in response to initiation of communications by the data collection station.

The receiver 204 may comprise a fast Fourier transform (FFT) module 219. The FFT module 219 may transform the communication signals from the time domain to the frequency domain.

The receiver 204 may comprise a pilot logic 250 comprising a channel estimator 252, a phase tracker 254, a buffer 256, and an equalizer 258. The pilot logic 250 may be configured for processing shifting pilot tones as well as data tones. The pilot logic 250 may comprise an equalizer 258 with hard-coded logic or running an equalizer application or instructions, a channel estimator 252, and a phase tracker 254.

The pilot logic 250 may comprise logic to determine, based upon channel and phase information, how to process pilot tones that shift locations every N symbols in an orthogonal frequency division multiplexing (OFDM) packet transmission. In particular, the pilot logic 250 may determine a signal-to-noise ratio (SNR) for the channel and determine whether to perform phase tracking without updating equalization or to perform both the phase tracking and updating channel estimation used by equalizer during the reception of the OFDM packet. The pilot logic 250 may also determine channel and phase information updates such as channel state information and phase correction information from pilot tones. For instance, the pilot logic 250 may determine that the SNR is high by comparing the SNR determined by the channel estimator 252 to a threshold SNR in, e.g., a register, and, in response, the pilot logic 250 may determine to use channel estimates determined by the channel estimator 252 and phase rotations determined by the phase tracker 254 by processing the pilot tones for phase tracking and updating the equalizer. On the other hand, if the pilot logic 250 determines that the SNR is low, the pilot logic 250 may use the phase rotations for phase tracking and not update the equalizer during the OFDM transmission after the training sequences in the preamble of the transmission.

The pilot logic 250 may comprise filters, delay elements, and taps or other logic to apply weighting functions to the input signal based upon weight values determined and updated from processing the pilot tones in the incoming signal. The weight coefficients for the weighting functions are weight values which may be adjusted based on the pilot tones to achieve a specific level of performance, and to, e.g., optimize signal quality at the receiver. In some embodiments, the pilot logic 250 is able to track channel changes over time (i.e., using the pilot tones to update the equalizer weight coefficients) because of the rotation of the pilot tones through each of the OFDM subcarriers over the OFDM packet through time. As noted above, the pilot tones are separated by some number of data subcarriers so that estimation of slope and intercept for subcarrier tracking could be maintained. As the pilot tones are shifted through symbol index locations across the band of the OFDM packet, the weight coefficients for the equalizer for the subcarriers that the pilot tones currently populate may be updated as well.

The receiver 204 may receive and convert the pilot tones to a baseband representation. The received pilot tones may then be input into the channel estimator 252 that uses the received sequences to determine updated channel estimates for the wireless channel (using, for example, a least squares approach). The channel estimator 252 may have a priori knowledge of the transmitted pilot tones, which it compares to the received signals to determine the channel estimates. The channel estimates may then be delivered to the equalizer 258.

For situations in which the pilot logic 250 determines that the SNR is high, the baseband representation of the received data signals may be delivered to the input of the equalizer 258, which filters the signals in a manner dictated by the weighting function in accordance with the weight coefficients currently being applied to the equalizer 258. The equalizer 258 may include any type of equalizer structure (including, for example, a transversal filter, a maximum likelihood sequence estimator (MLSE), and others). When properly configured, the equalizer 258 may reduce or eliminate undesirable channel effects within the received signals (e.g., inter-symbol interference).

For situations in which the pilot logic 250 determines that the SNR is low or determines that the SNR is high, the received data signals with pilot tones are delivered to the input of the phase tracker 254. The carrier phase offset or the differences between the frequency of the carrier wave derived by the transmitter of the access point and the frequency of the carrier wave derived by the receiver may cause a residual error after carrier frequency offset correction. This residual carrier frequency offset in the signal even after carrier frequency offset correction together with the sampling frequency offset cause phase rotation in subcarriers to increase within the OFDM packet. Cumulative phase increment can limit the number of OFDM symbols that can be transmitted in one packet so the phase tracker 254 may continuously track and compensate for the effect. For a low SNR, the phase tracker 254 may process the pilot tones to determine and implement phase correction information.

For a high SNR, the phase tracker 254 may also use the received pilot tones to track the weight coefficients applied to the equalizer 258. During system operation, the phase tracker 254 may regularly update the weight coefficients based on the magnitude and phase of the pilot tones. In addition to the received pilot tones, the phase tracker 254 may receive data from an output of the equalizer 258 as feedback for use in the phase tracking or phase correction process. The phase tracker 254 may use the initial channel estimates determined by the channel estimator 252 to determine the weight coefficients covariance matrix (C). The phase tracker 254 may then determine the value of the constant b (related to the channel changing rate) and calculate the weight coefficients changing covariance matrix (b*C). The square root of the weight coefficients changing covariance matrix may then be determined and used within a modified least mean square (LMS) algorithm to determine the updated channel weight coefficients, which are then applied to the equalizer 258.

In some embodiments, the pilot logic 250 may determine the presence or absence of a Doppler effect on the transmission and transmit a selection for N to an access point in response. For instance, in response to determining that a Doppler effect may be impairing the received signal and determining that the SNR is high, some embodiments of the pilot logic 250 may signal the access point that the receiver 204 requests that N=1 so the pilot tones shift after every symbol. However, if the pilot logic 250 determines that no Doppler effect is impairing the received signal and that the SNR is low, some embodiments of the pilot logic 250 may signal the access point that the receiver 204 requests that N=2 so the pilot tones shift after every other symbol.

The receiver 204 may also comprise an OFDM module 222, a demodulator 224, a deinterleaver 225, and a decoder 226, and the equalizer 258 may output the weighted data signals for the OFDM packet to the OFDM module 222. The OFDM 222 extracts signal information as OFDM symbols from the plurality of subcarriers onto which information-bearing communication signals are modulated. For instance, the OFDM symbols may comprise data associated with 24 data sub-carriers, two pilot sub-carriers, five guard sub-carriers, and one DC sub-carrier.

The OFDM module 222 may comprise a DBF module 220, and an STBC module 221. The received signals are fed from the equalizer to the DBF module 220 transforms N antenna signals into L information signals. And the STBC module 221 may transform the data streams from the space-time streams to spatial streams. In one embodiment, the demodulation is performed in parallel on the output data of the FFT. In another embodiment, a separate demodulator 224 performs demodulation separately.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TXVECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. The decoder 226 decodes the deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames included in the MPDU(s).

Figure 3A:
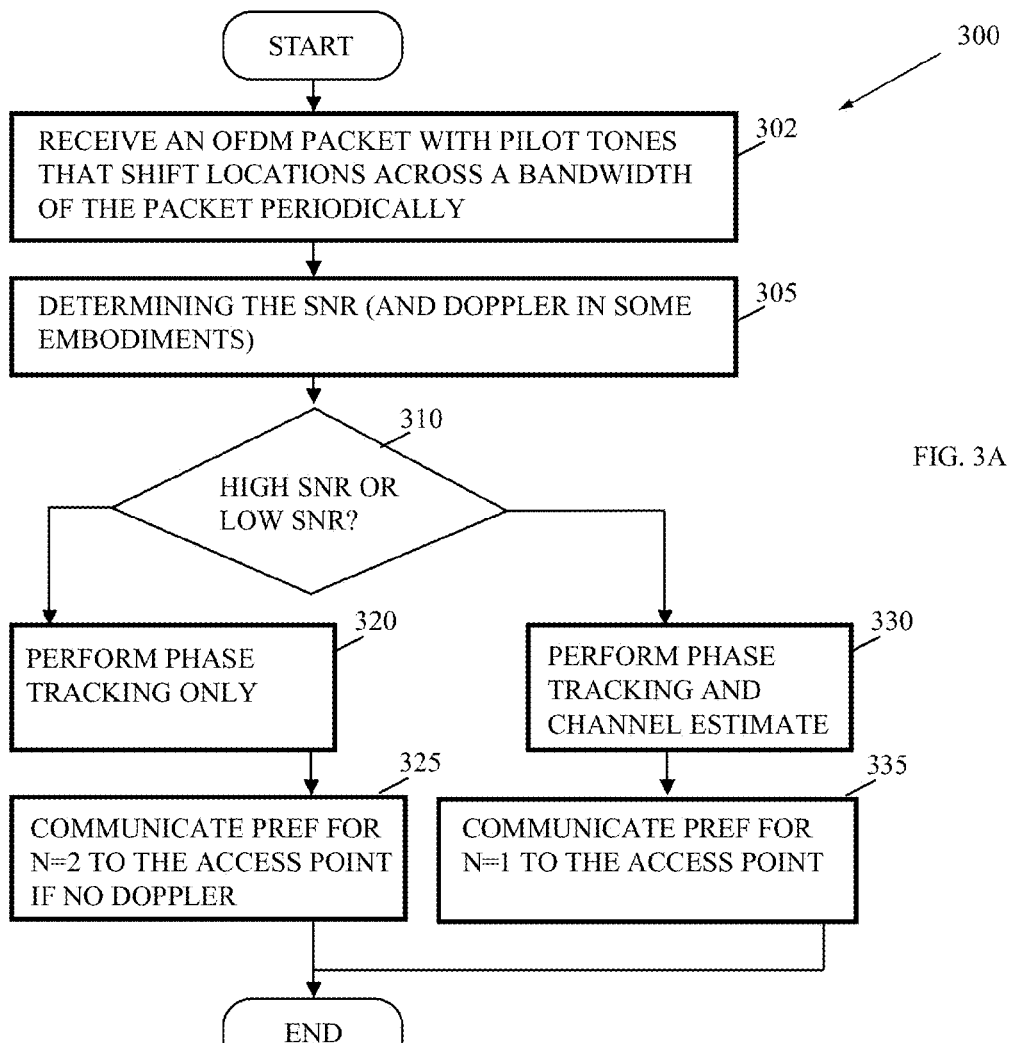
FIGS. 3A-B depict embodiments of flowcharts to select processing and process pilot tones and to generate, transmit, receive, parse, and interpret communications.
Figure 3B:
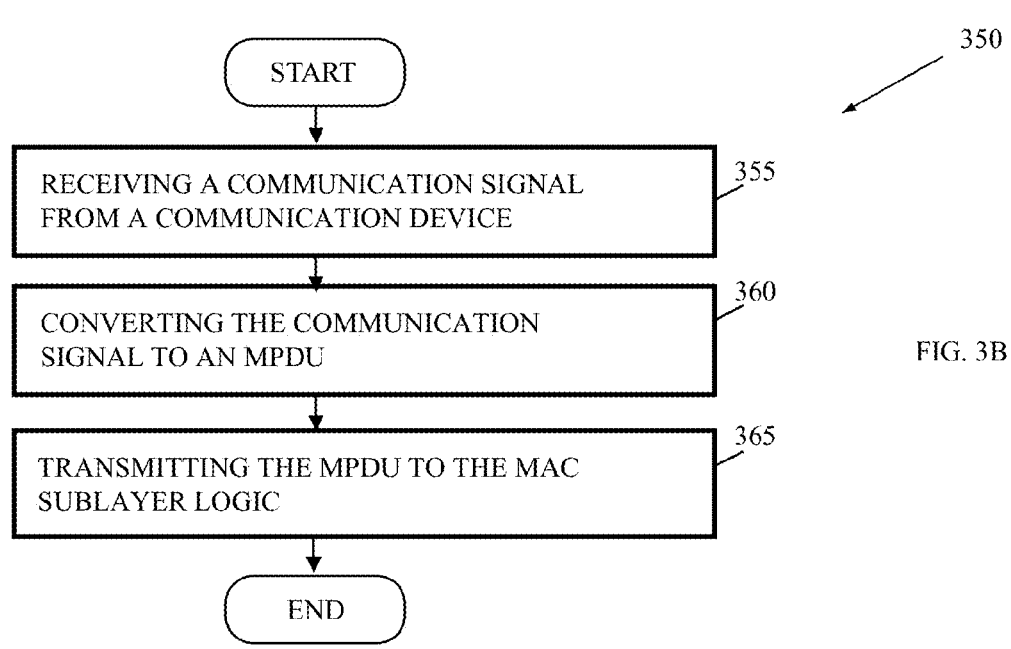

FIGS. 3A-B depict embodiments of flowcharts to process pilot tones and to generate, transmit, receive, parse, and interpret communications. Referring to FIG. 3A, the flowchart 300 may begin with receiving an OFDM packet with pilot tones that shift locations of across the bandwidth of the packet periodically (element 302). In many embodiments, the OFDM packet may be received one symbol at a time and the pilot tones may shift to a new location every N symbols, where N may be a settable, calculated or fixed value. Thus, the pilot tones' locations may remain constant for N symbols before shifting to the next location.

After the receiver begins to receive the OFDM packet, the receiver may process the preamble of the OFDM packet and perform initial channel estimations based upon the training sequences in the preamble to set of the weighting coefficients for the equalizer. The receiver may also determine the SNR (element 305) and compare the SNR to a threshold SNR to determine if the SNR is a low SNR or not a low SNR (a high SNR). In many embodiment embodiments, the SNR is a high SNR (or mid to high) if the value does not fall within the low SNR range. In several embodiments, the exact range of the SNRs that qualify for low SNRs may be determined based upon the front-end architecture of the receiver. In other embodiments, the value is standardized.

Some embodiments of the receiver may determine whether the Doppler effect affects the incoming signal (element 305). Signal degradation can also be caused by Doppler shift effects arising either from one wireless device moving at considerable speed relative to the other (e.g., a wireless device in a vehicle), or from a sizable object moving at considerable speed in the vicinity of the path of the signal between two wireless devices (e.g., a vehicle moving through the area). For instance, if the receiver is mobile such as in a moving automobile and the transmission carries a large payload, the amount of movement toward or away from the transmitter may be significant enough to impact the processing of the signals.

After determining the SNR, the receiver may determine whether the SNR is a high SNR or a low SNR (element 310). If the SNR is a low SNR, the receiver may determine that the appropriate processing for the shifting pilot tones is to process the pilot tones for the purposes of determining phase correction information and tracking the phase of the signal based upon the phase correction information (element 320). In such embodiments, the receiver may not update the equalizer but leave the equalizer operating with the original channel estimates based upon the training sequences in the preamble of the signal from the access point.

If the receiver detects a Doppler component in the signal, the receiver may determine whether the combination of the current number of symbols, N, for which the shifting pilot tones remain in the same location may elicit the receiver's best performance. For instance, the receiver may process a OFDM symbols of the OFDM transmission to determine a whether a Doppler component exists in the OFDM transmission. In some embodiments, the receiver may perform best when the SNR is low and N=2 so the receiver may communicate to the access point that the pilot tones should shift every other symbol (element 325)

On the other hand, if the receiver determines that the SNR is a high SNR (element 310), the receiver may determine that the appropriate processing of the shifting pilot tones include both channel estimation and phase tracking so the receiver may provide the carrier frequency offset corrected signal to both the channel estimator and the phase tracker to perform channel estimation and phase tracking (element 330). The channel estimator may estimate the channel and provide the channel estimations to the equalizer to update the weight coefficients applied to the signal. The phase tracker may track the phase based upon phase correction information determined from the signal. In some embodiments, the phase tracker may also provide phase correction information to the equalizer to update the equalizer weight coefficients.

In some embodiments, the receiver may perform best when the SNR is high and N=1 so the receiver may communicate the preference for N=1 to the access point to indicate that the access point may send subsequent packets to the receiver with the pilot tones shifting with transmission of every symbol (element 335).

Referring to FIG. 3B, the flowchart 350 begins with a receiver of a station such as the receiver 204 in FIG. 2 receiving a communication signal via one or more antenna(s) such as an antenna element of antenna array 218 (element 355). The communication signal may comprise the pilot tones that shift to new locations every N symbols. Thus, the pilot tone location remains constant for N symbols, then shifts to the next location. The receiver may then use the N pilot symbols to make a channel estimate using an appropriate algorithm.

The receiver may convert the communication signal into one or more MPDUs in accordance with the process described in the preamble (element 360). More specifically, the received signal may be fed from the one or more antennas to a pilot logic such as pilot logic 250 for equalization and phase correction and then to a DBF such as the DBF 220. The DBF transforms the signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 360) and transmits the one or more MPDUs to MAC sublayer logic such as MAC sublayer logic 202 (element 365).

The MAC sublayer logic may parse and interpret the frame in each of the MPDUs. For instance, the MAC sublayer logic may parse and interpret the frame to determine the frame type and subtype.

The following examples pertain to further embodiments. One example comprises a method. The method may involve receiving an orthogonal frequency division multiplexing transmission with pilot tones shifting locations periodically between symbol indices of orthogonal frequency division multiplexing symbols; processing the orthogonal frequency division multiplexing transmission to determine if the signal to noise ratio is low; and performing channel updates based upon processing the orthogonal frequency division multiplexing transmission, wherein the channel updates comprise phase tracking and, if the signal to noise ratio is not low, the phase updates comprise updating the phase correction and equalizer.

In some embodiments, the method may further comprise determining whether the receiver is moving and/or whether any Doppler effect is present. In some embodiments, the method may further comprise signaling an access point to indicate a preference for the pilot tones to shift every other symbol if the signal to noise ratio is low and to shift every symbol if the signal to noise ratio is high. In many embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every N orthogonal frequency division multiplexing symbols. In several embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every orthogonal frequency division multiplexing symbol. In several embodiments, processing the orthogonal frequency division multiplexing transmission comprises processing a OFDM symbols to determine a whether a Doppler component exists in the orthogonal frequency division multiplexing transmission. In several embodiments, processing the orthogonal frequency division multiplexing transmission comprises processing a preamble to determine a channel estimate based upon a long training sequence and setting the initial coefficients of the equalizer based upon the long training sequence. And, in some embodiments, processing the orthogonal frequency division multiplexing transmission comprises processing pilot tones to determine channel and phase information, wherein the channel and phase information comprises channel state information and phase correction information.

Another example comprises an apparatus. The apparatus may comprise pilot logic coupled to receive an orthogonal frequency division multiplexing transmission with pilot tones shifting locations periodically between symbol indices of orthogonal frequency division multiplexing symbols; process the orthogonal frequency division multiplexing transmission to determine if the signal to noise ratio is low; and perform channel updates based upon processing the orthogonal frequency division multiplexing transmission, wherein the channel updates comprise phase tracking and, if the signal to noise ratio is not low, the channel updates comprise phase correction and updating the equalizer; an orthogonal frequency division multiplexing coupled with the pilot logic.

In some embodiments, the apparatus may further comprise an antenna array coupled with the pilot logic to receive the orthogonal frequency division multiplexing transmission. In some embodiments, the pilot logic comprises logic to process OFDM symbols to determine a whether a Doppler component exists in the orthogonal frequency division multiplexing transmission. In some embodiments, the pilot logic comprises logic to signal an access point to indicate a preference for the pilot tones to shift every other symbol if the signal to noise ratio is low and to shift every symbol if the signal to noise ratio is high. In some embodiments, the pilot logic comprises logic to process a preamble to determine a whether a Doppler component exists in the orthogonal frequency division multiplexing transmission. In some embodiments, the pilot logic comprises logic to process the pilot tones to determine channel and phase information comprises determining channel state information and phase correction information for the channel. In some embodiments, the pilot logic comprises logic to receive the orthogonal frequency division multiplexing transmission with pilot tones shifting the pilot tones every N orthogonal frequency division multiplexing symbols. And, in some embodiments, the pilot logic comprises logic to process a preamble to determine a channel estimate based upon a long training sequence and setting the initial coefficients of the equalizer based upon the long training sequence.

Another example comprises a system. The system may comprise a receiver coupled with the memory to receive an orthogonal frequency division multiplexing transmission with pilot tones shifting locations periodically between symbol indices of orthogonal frequency division multiplexing symbols; process the orthogonal frequency division multiplexing transmission to determine if the signal to noise ratio is low; and perform channel updates based upon processing the orthogonal frequency division multiplexing transmission, wherein the channel updates comprise phase tracking and, if the signal to noise ratio is not low, the phase updates comprise updating the equalizer; and a transmitter to transmit a second orthogonal frequency division multiplexing transmission with pilot tones shifting locations periodically.

In some embodiments, the system may further comprise an antenna array coupled with the receiver to receive the orthogonal frequency division multiplexing transmission and the transmitter to transmit the second orthogonal frequency division multiplexing transmission. In some embodiments, the receiver comprises logic to process a preamble to determine a whether a Doppler component exists in the orthogonal frequency division multiplexing transmission. In some embodiments, the receiver comprises logic to signal an access point to indicate a preference for the pilot tones to shift every other symbol if the signal to noise ratio is low and to shift every symbol if the signal to noise ratio is high. In some embodiments, the receiver comprises logic to process a OFDM symbols to determine a whether a Doppler component exists in the orthogonal frequency division multiplexing transmission. In some embodiments, the receiver comprises logic to process the pilot tones to determine channel and phase information comprises determining channel state information and phase correction information for the channel. In some embodiments, the receiver comprises logic to receive the orthogonal frequency division multiplexing transmission with pilot tones shifting the pilot tones every N orthogonal frequency division multiplexing symbols. And, in some embodiments, the receiver comprises logic to process a preamble to determine a channel estimate based upon a long training sequence and updating the equalizer based upon the long training sequence.

The following examples pertain to further embodiments. One example comprises a machine-accessible product. The machine-accessible product may comprise a medium containing instructions for channel updates with shifting pilot tones, wherein the instructions, when executed by the access point, causes the access point to perform operations, the operations comprising: receiving an orthogonal frequency division multiplexing transmission with pilot tones shifting locations periodically between symbol indices of orthogonal frequency division multiplexing symbols; processing the orthogonal frequency division multiplexing transmission to determine if the signal to noise ratio is low; and performing channel updates based upon processing the orthogonal frequency division multiplexing transmission, wherein the channel updates comprise phase tracking and, if the signal to noise ratio is not low, the phase updates comprise updating the equalizer.

In some embodiments, the operations may further comprise signaling an access point to indicate a preference for the pilot tones to shift every other symbol if the signal to noise ratio is low and to shift every symbol if the signal to noise ratio is high. In some embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every N orthogonal frequency division multiplexing symbols. In many embodiments, processing the orthogonal frequency division multiplexing transmission comprises processing a OFDM symbols to determine a whether a Doppler component exists in the orthogonal frequency division multiplexing transmission. In several embodiments, the operations may further comprise receiving comprises receiving the orthogonal frequency division multiplexing transmission via an antenna array. In several embodiments, processing the pilot tones to determine channel and phase information comprises determining channel state information and phase correction information for the channel. In several embodiments, processing the orthogonal frequency division multiplexing transmission comprises processing a preamble to determine a channel estimate based upon a long training sequence and setting the initial coefficients of the equalizer based upon the long training sequence. And, in some embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every orthogonal frequency division multiplexing symbol.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk—read only memory (CD-ROM), compact disk—read/write memory (CD-R/W), digital video disk (DVD)—read only memory (DVD-ROM), DVD-random access memory (DVD-RAM), DVD-Recordable memory (DVD-R), and DVD—read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method for channel updates with shifting pilot tones, the method comprising:
    receiving, via a channel, an orthogonal frequency division multiplexing transmission with pilot tones shifting sub-carriers periodically between symbol indices of orthogonal frequency division multiplexing symbols;
    processing the orthogonal frequency division multiplexing transmission to determine if a signal to noise ratio for the channel is below a threshold for the channel; and
    performing channel updates based upon processing the orthogonal frequency division multiplexing transmission symbols with pilot tones,
    wherein, if the signal to noise ratio for the channel is below the threshold for the channel, performing the channel updates comprises updating phase tracking and not updating weight coefficients of an equalizer; and
    wherein, if the signal to noise ratio for the channel is not below the threshold for the channel, performing the channel updates comprises updating the phase tracking and weight coefficients of the equalizer.

2. The method of claim 1, further comprising determining whether a receiver is moving to determine if a Doppler effect is present.

3. The method of claim 1, further comprising signaling an access point to indicate a preference for the pilot tones to shift every other symbol if the signal to noise ratio is below the threshold and to shift every symbol if the signal to noise ratio is not below the threshold.

4. The method of claim 1, wherein receiving an orthogonal frequency division multiplexing transmission with pilot tones shifting sub-carriers periodically between symbol indices of orthogonal frequency division multiplexing symbols comprises receiving the orthogonal frequency division multiplexing transmission with pilot tones shifting the pilot tones every N orthogonal frequency division multiplexing symbols.

5. The method of claim 1, wherein receiving an orthogonal frequency division multiplexing transmission with pilot tones shifting sub-carriers periodically between symbol indices of orthogonal frequency division multiplexing symbols comprises receiving the orthogonal frequency division multiplexing transmission with pilot tones shifting the pilot tones every orthogonal frequency division multiplexing symbol.

6. The method of claim 1, wherein processing the orthogonal frequency division multiplexing transmission comprises determining whether a Doppler component exists in the orthogonal frequency division multiplexing transmission.

7. The method of claim 1, wherein processing the orthogonal frequency division multiplexing transmission comprises processing a preamble to determine a channel estimate based upon a long training sequence and setting initial coefficients of the equalizer based upon the long training sequence.

8. The method of claim 1, wherein processing the orthogonal frequency division multiplexing transmission comprises processing pilot tones to determine channel and phase information, wherein the channel and phase information comprises channel state information and phase correction information.

9. A device for channel updates with shifting pilot tones, the device comprising:
    logic comprising hardware to receive, via a channel, an orthogonal frequency division multiplexing transmission with pilot tones shifting sub-carriers periodically between symbol indices of orthogonal frequency division multiplexing symbols; process the orthogonal frequency division multiplexing transmission to determine if a signal to noise ratio for the channel is below a threshold for the channel; and
    wherein the logic comprises a phase tracker and an equalizer to perform channel updates based upon processing the orthogonal frequency division multiplexing transmission symbols with pilot tones, wherein, if the signal to noise ratio for the channel is below the threshold for the channel, performance of the channel updates comprises updates to the phase tracker tracking and not updates to weight coefficients of an equalizer; and wherein, if the signal to noise ratio for the channel is not below the threshold for the channel, performance of the channel updates comprises updates to the phase tracker and to weight coefficients of the equalizer.

10. The device of claim 9, further comprising a processor, a radio, and one or more antennas coupled with the logic to receive the orthogonal frequency division multiplexing transmission.

11. The device of claim 9, wherein the logic comprises logic to determine a whether a Doppler component exists in the orthogonal frequency division multiplexing transmission.

12. The device of claim 9, wherein the logic comprises logic to signal an access point to indicate a preference for the pilot tones to shift every other symbol if the signal to noise ratio is below the threshold and to shift every symbol if the signal to noise ratio is not below the threshold.

13. The device of claim 9, wherein the logic comprises logic to determine whether the device is moving to determine if a Doppler effect is present.

14. The device of claim 9, wherein the logic comprises logic to determine channel state information and phase correction information for the channel.

15. The device of claim 9, wherein the logic comprises logic to receive the orthogonal frequency division multiplexing transmission with pilot tones shifting every N orthogonal frequency division multiplexing symbol.

16. The device of claim 9, wherein the logic comprises logic to process a preamble to determine a channel estimate based upon a long training sequence and set initial coefficients of the equalizer based upon the long training sequence.

17. A system for channel updates with shifting pilot tones, the system comprising:
- a receiver coupled with the memory to receive, via a channel, an orthogonal frequency division multiplexing transmission with pilot tones shifting sub-carriers periodically between symbol indices of orthogonal frequency division multiplexing symbols; process the orthogonal frequency division multiplexing transmission to determine if a signal to noise ratio for the channel is below a threshold for the channel; and perform channel updates based upon processing the orthogonal frequency division multiplexing transmission symbols with pilot tones, wherein, if the signal to noise ratio for the channel is below the threshold for the channel, performance of the channel updates comprises updates to a phase tracker and not updates to weight coefficients of an equalizer, and wherein if the signal to noise ratio for the channel is not below the threshold for the channel, performance of the channel updates comprises updates to the phase tracker and to weight coefficients of the equalizer; and
- a transmitter to transmit a second orthogonal frequency division multiplexing transmission with pilot tones shifting sub-carriers periodically.

18. The system of claim 17, further comprising an antenna array coupled with the receiver to receive the orthogonal frequency division multiplexing transmission and with the transmitter to transmit the second orthogonal frequency division multiplexing transmission.

19. The system of claim 17, wherein the receiver comprises logic to determine a whether a Doppler component exists in the orthogonal frequency division multiplexing transmission.

20. The system of claim 17, wherein the receiver comprises logic to signal an access point to indicate a preference for the pilot tones to shift every other symbol if the signal to noise ratio is below the threshold and to shift every symbol if the signal to noise ratio is not below the threshold.

21. The system of claim 17, wherein the receiver comprises logic to determine whether a receiver is moving to determine if a Doppler effect is present.

22. The system of claim 17, wherein the receiver comprises logic to determine channel state information and phase correction information for the channel.

23. The system of claim 17, wherein the receiver comprises logic to receive the orthogonal frequency division multiplexing transmission with pilot tones shifting every N orthogonal frequency division multiplexing symbols.

24. The system of claim 17, wherein the receiver comprises logic to process a preamble to determine a channel estimate based upon a long training sequence and set initial coefficients of the equalizer based upon the long training sequence.

25. A machine-accessible product comprising:
a non-transitory machine-accessible medium containing instructions to perform channel updates with shifting pilot tones, wherein the instructions, when executed by a station, causes the station to perform operations, the operations comprising:
receiving, via a channel, an orthogonal frequency division multiplexing transmission with pilot tones shifting sub-carriers periodically between symbol indices of orthogonal frequency division multiplexing symbols;
processing the orthogonal frequency division multiplexing transmission to determine if a signal to noise ratio for the channel is below a threshold for the channel; and
performing channel updates based upon processing the orthogonal frequency division multiplexing transmission symbols with pilot tones,
wherein, if the signal to noise ratio for the channel is below the threshold for the channel, performing the channel updates comprises updating phase tracking and not updating weight coefficients of an equalizer; and
wherein, if the signal to noise ratio for the channel is not below the threshold for the channel, performing the channel updates comprises updating the phase tracking and weight coefficients of the equalizer.

26. The machine accessible product of claim 25, wherein the operations further comprise signaling an access point to indicate a preference for the pilot tones to shift every other symbol if the signal to noise ratio is below the threshold and to shift every symbol if the signal to noise ratio is not below the threshold.

27. The machine accessible product of claim 25, wherein receiving an orthogonal frequency division multiplexing transmission with pilot tones shifting sub-carriers periodically between symbol indices of orthogonal frequency division multiplexing symbols comprises receiving the orthogonal frequency division multiplexing transmission with pilot tones shifting the pilot tones every N orthogonal frequency division multiplexing symbols.

28. The machine accessible product of claim 25, wherein processing the orthogonal frequency division multiplexing transmission comprises determining whether a Doppler component exists in the orthogonal frequency division multiplexing transmission.

29. The machine accessible product of claim 25, wherein processing the orthogonal frequency division multiplexing transmission comprises processing a preamble to determine a channel estimate based upon a long training sequence and setting initial coefficients of the equalizer based upon the long training sequence.

30. The machine accessible product of claim 25, wherein processing the orthogonal frequency division multiplexing transmission comprises processing pilot tones to determine channel and phase information, wherein the channel and phase information comprises channel state information and phase correction information.

* * * * *